No. 737,193. PATENTED AUG. 25, 1903.
A. M. AMOS.
STEAM COOKER.
APPLICATION FILED JUNE 19, 1901.
NO MODEL. 3 SHEETS—SHEET 1.
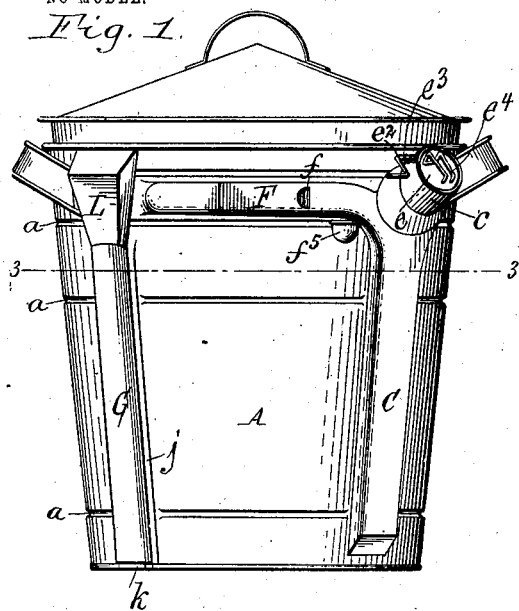
Fig. 1.
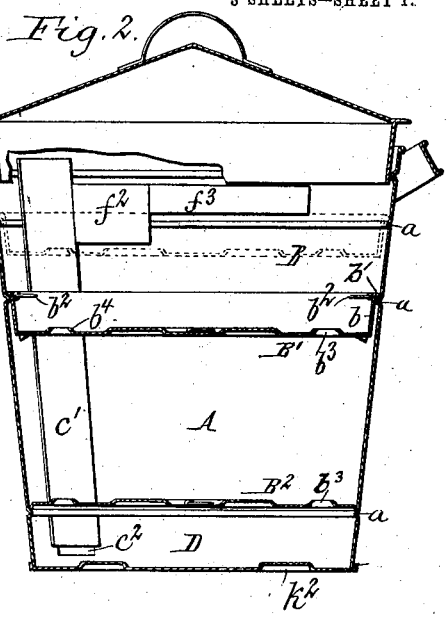
Fig. 2.
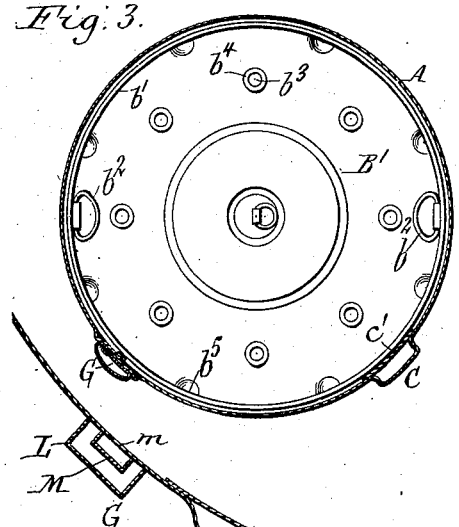
Fig. 3.
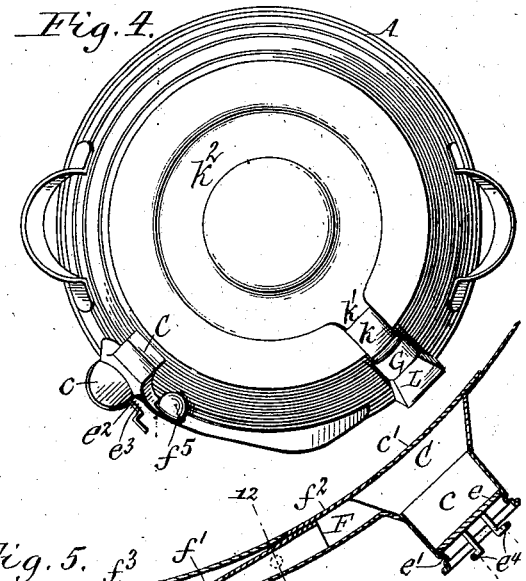
Fig. 4.
Fig. 5.
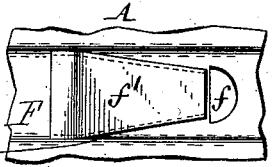
Fig. 8.
Witnesses:
Louis W. Gratz
Emma M. Graham
A. M. Amos, Inventor
By Geyer & Popp
Attorneys.

No. 737,193. PATENTED AUG. 25, 1903.
A. M. AMOS.
STEAM COOKER.
APPLICATION FILED JUNE 19, 1901.
NO MODEL. 3 SHEETS—SHEET 3.
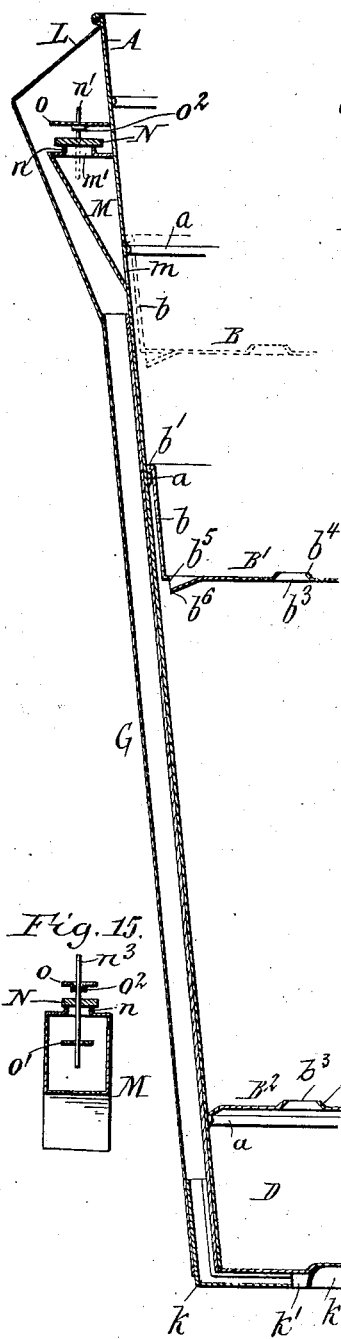
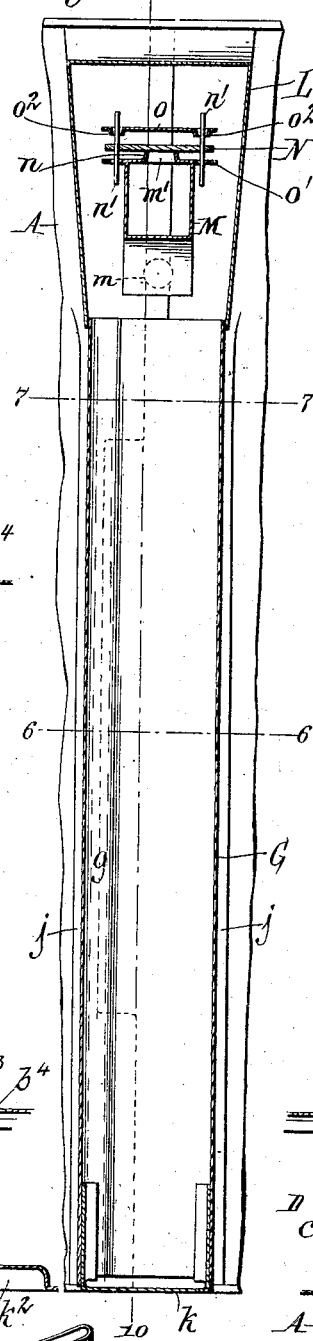
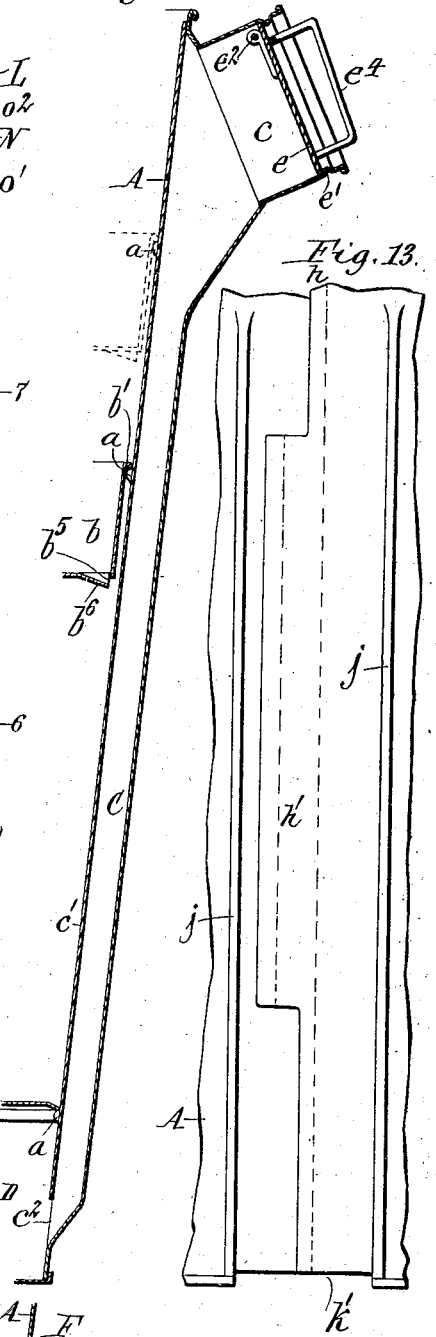
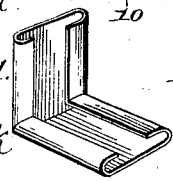
A. M. Amos,
Inventor
By Geyer & Popp
Attorneys.
Witnesses:
Louis W. Gratz
Emma M. Graham.

No. 737,193. Patented August 25, 1903.

UNITED STATES PATENT OFFICE.

ALEXANDER M. AMOS, OF BUFFALO, NEW YORK.

STEAM-COOKER.

SPECIFICATION forming part of Letters Patent No. 737,193, dated August 25, 1903.

Application filed June 19, 1901. Serial No. 65,135. (No model.)

*To all whom it may concern:*

Be it known that I, ALEXANDER M. AMOS, a citizen of the United States, residing at Buffalo, in the county of Erie and State of New York, have invented new and useful Improvements in Steam-Cookers, of which the following is a specification.

This invention relates more particularly to steam-cookers which are divided into a number of separate compartments by removable horizontal disks or diaphragms and which are provided with a filling-tube for supplying water to the cooker, a low-water signal for automatically giving an alarm when the cooker requires to be replenished with water, and a steam-exit or vent-tube leading from the top to the bottom of the cooker for conducting the steam and cooking vapors into the fireplace of the stove. A cooker of this character is shown and described in Letters Patent of the United States, No. 566,884, granted to me September 1, 1896.

One of the objects of my present invention is the provision of a simple and inexpensive joint between the steam-vent tube and the cooker-body which is unaffected by heat, so as to avoid the leakage and destruction of the joint liable to occur by the use of a soldered joint, especially when the cooker is carelessly allowed to boil dry.

My invention has the further objects to provide the cooker with an improved signal-whistle which gives a loud alarm, to render the valve of the steam-vent tube simple in construction and reliable in action, and to improve the construction of the cooker in other respects.

Figure 6:
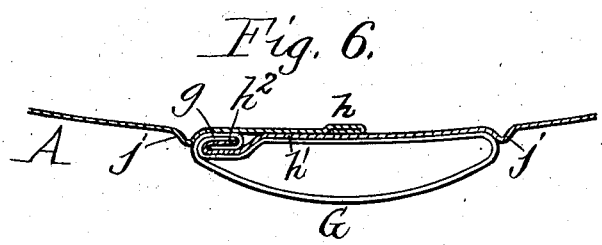
Figure 7:
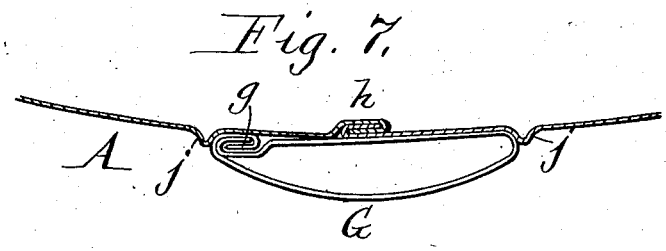

In the accompanying drawings, consisting of three sheets, Figure 1 is an elevation of my improved cooker viewed from the side at which the filling and steam-escape tubes are located. Fig. 2 is a vertical section of the same. Fig. 3 is a horizontal section in line 3 3, Fig. 1. Fig. 4 is a bottom plan view of the cooker. Fig. 5 is a fragmentary horizontal section, on an enlarged scale, taken through the whistle and the spout of the filling-tube. Figs. 6 and 7 are enlarged horizontal sections of the steam-tube and the cooker-body in lines 6 6 and 7 7, Fig. 9. Fig. 8 is an enlarged fragmentary interior view of the whistle. Fig. 9 is a vertical section of the steam-tube on an enlarged scale. Fig. 10 is a transverse vertical section thereof in line 10 10, Fig. 9. Fig. 11 is a detached perspective view of the elbow-shaped extension applied to the lower end of the steam-tube. Fig. 12 is a fragmentary vertical section in line 12 12, Fig. 5. Fig. 13 is a fragmentary side elevation of the seamed portion of the cooker-body to which the steam-tube is applied, the latter being omitted. Fig. 14 is an enlarged fragmentary vertical section of the cooker, taken through the filling-tube. Fig. 15 is a fragmentary vertical section similar to the upper portion of Fig. 9, showing a modified construction of the steam-exit valve.

Like letters of reference refer to like parts in the several figures.

A is the body of the cooker, which is preferably flared upward, as shown, and provided with the usual internal beads or shoulders $a$ for supporting the removable division-plates or diaphragms B B' B². All of these diaphragms excepting the lowermost one are preferably provided with an upwardly-extending marginal rim $b$, having at its upper edge a projecting bead $b'$, which rests upon the adjacent bead of the cooker for suspending the diaphragm therefrom. Each of these shallow dish-shaped diaphragms is provided at its upper edge with rings $b^2$ or other suitable means for removing the same from the cooker. The diaphragms are provided in their bottom with steam openings or passages $b^3$, which are surrounded by the usual upwardly-extending collars or guards $b^4$, which prevent the water of condensation from dripping through the openings upon the victuals in the compartment next below. As this water of condensation cannot escape over the edge of the diaphragm by reason of the rim $b$, it is necessary to provide the diaphragm with suitable drain-openings, and for this purpose each diaphragm is formed in its bottom adjacent to its rim with openings $b^5$. These openings are preferably provided with deflecting lips or troughs $b^6$, which extend downwardly and outwardly from the inner edges thereof, so as to direct the water of condensation toward the wall of the cooker and cause the same to flow down the same, thereby preventing the water from coming in contact with the victuals and also preventing the water from trickling along the under side of the diaphragm toward its center and dropping upon the food below, which it would otherwise be apt to do, owing to the tendency of the diaphragm to sag slightly at the center. The drain-openings and their lips $b^6$ are preferably formed by simply cutting slits in the diaphragm and depressing the metal immediately behind the slits below the surface of the diaphragm, as shown.

C is the filling-tube, arranged on the outer side of the cooker-body and extending nearly to the bottom thereof. The lower end of this tube communicates with the steam-generating chamber D, while its upper end is provided with a suitably-inclined spout $c$, into which the water is poured. The front and side walls and the closed lower end of this filling-tube are preferably stamped integral with the cooker-body, as shown, and its open inner side is closed by a plate $c'$, which is soldered or otherwise secured to the wall of the cooker, as shown in Figs. 2 and 5. The covering-plate $c'$ extends from the upper end of the filling-tube nearly to its lower end, so as to leave an opening $c^2$, by which the tube communicates with the generating-chamber D. The outer portion of the spout $c$, which is preferably cylindrical, as shown, is normally closed by a hinged plug or disk $e$, which bears against the inner side of an internal annular bead, shoulder, or stop $e'$, formed near the outer end of the spout, as shown in Figs. 5 and 14. This plug is secured to a transverse rock-shaft $e^2$, journaled at the upper end of the spout and having a cranked handle for turning it, as shown in Fig. 1. The hinged plug is free to swing inwardly and is yieldingly held in its closed position by a suitable spring. In the construction shown in the drawings a spring $e^3$ is applied to the rock-shaft, which tends to close the plug against the stop $e'$. The plug is preferably provided on its outer side with guards or projections $e^4$, which extend outwardly beyond the face thereof and against which the end of the tea-kettle spout is adapted to bear in filling the cooker, as shown by dotted lines in Fig. 5. By providing the plug with such guards or projections the plug is partially opened immediately upon pressing the spout against the projections and before the kettle-spout is inclined sufficiently to deliver the water, thus permitting the water to freely enter the spout and avoiding spilling of the water, which would be liable to take place if the plug had no such guards and the spout came in direct contact therewith. These projections preferably consist of a pair of inverted U-shaped bars formed of wire. These bars are substantially parallel with each other and the space between the same is somewhat less than the greatest diameter of the nose of the spout, so that the spout is allowed to enter a short distance between the bars, but not far enough to bear against the plug, thus insuring a free passage for the water between the end of the spout and the plug. The guards $e^4$ are preferably arranged in a vertical plane, and the plug is located a short distance inwardly from the edge of the filling-spout, as shown, to form a projecting rim around the plug. By this construction the guards center the kettle-spout and prevent the same from slipping laterally, while the projecting lower portion of the filling-spout forms a rest for the kettle-spout which prevents the same from slipping downward out of engagement with the guards, thereby effectually guarding against spilling water in filling the cooker.

F is a whistle tube or chamber preferably arranged horizontally on the outer side of the cooker-body, near the top thereof, and communicating at one end with the adjacent portion of the filling-tube C, while its other end is closed. This whistle-tube is provided in its outer wall between its ends with an aperture $f$, forming the whistle-opening. $f'$ is a deflecting-lip which extends obliquely across the whistle-tube from a point near the filling-tube C to a point opposite the front edge of said opening, as shown in Fig. 5, so as to direct the steam which enters the front end of the whistle-tube against the rear edge of the whistle-opening for producing an alarm. The whistle-tube is preferably stamped in one piece with the cooker-body, and its inner side is closed by plates $f^2$ $f^3$, soldered or otherwise secured to the inner side of the body, as shown in Fig. 5. By this construction and arrangement of the whistle-tube the same has a large capacity and contains a comparatively large volume of air, producing a correspondingly-loud alarm, which is an especially desirable feature, as it has been found by experience that unless the alarm is quite loud the signal is apt to be unheeded and the cooker allowed to boil dry, destroying the joints and producing leakage. The whistle-tube is provided in its bottom with a drain-opening $f^4$ for the escape of the water resulting from the condensation of the steam, and the tube is inclined toward this opening, as shown. This drain-opening is arranged near the rear portion of the deflecting-plate $f'$ and on the rear side thereof, so that the steam cannot escape directly through said opening, but is compelled to act upon the edge of the whistle-aperture before reaching the same. A cup $f^5$ is arranged on the cooker under the drain-opening $f^4$ to catch the drainage therefrom. By stamping the greater portion of the filling-tube and the whistle-tube integral with the cooker-body the number of joints and the liability to leakage is reduced and the cost of the cooker is reduced in the same measure.

G is the steam-exit or vent-tube extending along the outer side of the cooker from near the top to the bottom thereof. The straight main portion of this tube is formed from an oblong blank of tin or other sheet metal, the longitudinal edges of which are bent to form interlocking lips or flanges g, which are located at the back of the tube, preferably at or near one of its lateral edges, as shown in Figs. 6 and 7.

h is the usual vertical seam of the cooker-body. The portion of the body forming the outer part of this seam or joint is provided with a wing or extension $h'$, which projects a short distance beyond the seam and is formed with a lip or flange $h^2$, as shown in Fig. 6. The interlocking flanges g of the steam-tube are interlocked or interseamed with the flange of the extension $h'$, as shown in Fig. 6, thereby firmly securing the tube to the cooker-body and forming a reliable and solderless joint which is unaffected by the heat, and therefore not liable to open and cause leakage in case the attendant should neglect to replenish the cooker with water when necessary. In order to produce a sightly finish, the cooker-body is formed at both edges of the steam-tube with raised vertical beads j, as shown. In attaching the steam-tube to the body its flanges are loosely engaged with each other and these flanges are then interlocked with the flange of the body by sliding the tube endwise on the latter, after which the several interlocked flanges are compressed to form a tight joint. By this construction the steam-tube is not only secured to the body without the use of solder, but it also forms a cover which conceals the usual seam of the cooker-body, giving the same the appearance of being formed of a solid or continuous piece. The steam-tube is provided at its lower end with an elbow-shaped extension k, which extends underneath the cooker-bottom and is seated in a recess $k'$, formed in the under side of the latter, so that the under side of this tube extension is flush with the bottom of the cooker. The inner end of this tube extension is open for conducting the steam and cooking-vapors into the fire-pot of the stove. The cooker-bottom is preferably provided in its under side with an annular or other suitably-shaped groove or depression $k^2$, which communicates with the tube extension k, as shown in Figs. 4 and 10, and forms a steam-confining chamber. When the cooker is placed upon the stove without removing the stove-lid, the bottom of this groove is closed by the top of the stove and the steam retained therein. Any steam entering said chamber under these circumstances is by this means superheated and dried up and the cooking-vapors are largely destroyed.

L is the cap or enlargement arranged at the upper end of the steam-tube and communicating with the latter, and M the spout or casing arranged in this enlargement and communicating at its lower end with the interior of the cooker by the usual vent-opening m. $m'$ is the escape-opening formed in the closed upper end of the casing M, and N the check-valve applied to this opening, as shown in Figs. 9 and 10. The escape-opening $m'$ is preferably provided with an upwardly-projecting rim n, which forms a comparatively sharp-edged valve-seat. The valve N consists of a flat plate which rests loosely upon this sharp-edged seat and which is guided by vertical rods $n'$ secured to the end portions thereof and sliding in openings formed in upper and lower brackets $o$ $o'$. The upper bracket o is secured to the wall of the cooker above the valve, while the lower brackets $o'$ consist of perforated ears which project from opposite sides of the case M, as shown in Fig. 9. By this means the valve is accurately seated and guided and prevented from binding. The upper guide-openings of the rods $n'$ may be provided with downwardly-projecting rims $o^2$ $o^2$, forming sharp-edged stops which prevent the plate-valve from seating against the flat under side of the upper bracket o. By this construction the valve is not liable to stick to its seat or to the upper bracket in case the rims of the openings $o^2$ $o^2$ should become coated with grease. If desired, the valve may be provided with a single guide-rod $n^3$, secured centrally thereto and passing through the steam-passage of the case M, as shown in Fig. 15. In this case the upper bracket o is provided with a single central guide-opening for the rod and the lower bracket $o'$ of the rod is suitably secured within the case M. The cap L also serves as a reinforcement for the body-seam of the cooker, which prevents the same from spreading in case the cover should be violently or excessively forced down into the cooker. If desired, the plug e may be opened by hand by means of the crank-shaft $e^2$ for pouring water into the filling-tube C from a pitcher or other suitable vessel.

In the use of the cooker a sufficient quantity of water is fed into the steam-generating chamber C to cover the aperture $c^2$, by which the filling-tube communicates with this chamber. The valve N checks the escape of the steam from the cooker and maintains a uniform pressure in the various compartments thereof in a well-known manner, the valve opening and allowing the steam to escape through the vent-tube G when the steam-pressure overcomes the weight or resistance of the valve. When the aperture $c^2$ becomes uncovered by falling of the water-level, the steam ascends through the filling-tube, and as it cannot escape from the latter past the plug e it issues through the whistle-opening f, thereby sounding the whistle and giving the low-water alarm.

I claim as my invention—

1. The combination with the steam-generating chamber of a steam-cooker, of an upright filling-tube extending along the side of the cooker and having its front, sides and closed lower end stamped integral with the cooker-body, a whistle-tube extending from one side of said filling-tube and having its front, sides and closed rear end stamped integral with the cooker-body, and a covering plate or plates applied to the open inner sides of said filling and whistle tubes and secured to the cooker-body, substantially as set forth.

2. In a steam-cooker, the combination of the steam-generating chamber, a filling-tube arranged at one side of the cooker and communicating with said chamber, said tube being provided at its upper end with an inclined spout, an inwardly-opening plug arranged in said spout and provided on its front side with a pair of opposing centering-guards adapted to receive the end of a kettle-spout between them, and means for yieldingly holding the plug in its closed position, substantially as set forth.

3. In a steam-cooker, the combination of the steam-generating chamber, a filling-tube arranged at one side of the cooker and communicating with said chamber, said tube being provided at its upper end with an inclined spout, an inwardly-opening plug arranged in said spout at a distance from its outer edge and provided on its front side with a pair of opposing guards arranged in a vertical plane and adapted to receive the end of a kettle-spout between them, and means for yieldingly holding the plug in its closed position, substantially as set forth.

4. In a steam-cooker, the combination of the steam-generating chamber, a filling-tube arranged at one side of the cooker and communicating with said chamber, said tube being provided at its upper end with a spout, an inwardly-opening plug arranged in said spout and provided on its front side with a pair of opposing guards of inverted-U form arranged in a vertical plane, and means for yieldingly holding the plug in its closed position, substantially as set forth.

5. The combination with the body of a steam-cooker having a vertical seam or joint, one of the members of said joint having a flanged wing which extends beyond the joint, of an upright tube or conduit provided on its rear side with a lip or flange which is interlocked with said flanged wing, substantially as set forth.

6. The combination with the body of a steam-cooker having a vertical seam or joint, one of the members of said joint having a flanged wing which extends beyond the joint, of an upright tube or conduit having its meeting longitudinal edges provided with engaging lips or flanges which interlock with said flanged wing, substantially as set forth.

7. The combination with the body of a steam-cooker having a vertical seam or joint and provided on one side of said joint with an external vertical lip or flange, of an upright tube or conduit arranged to cover said joint and provided on its rear side with a lip or flange which interlocks with the flange of the cooker-body, substantially as set forth.

8. In a steam-cooker, the combination of the body provided with a flat bottom having in its under side an annular groove forming a steam-chamber and a radial recess or depression leading from said groove to the wall of the body, and a steam-vent tube extending along the side of the cooker and provided at its lower end with an inward extension which occupies said radial recess and opens into said annular groove, substantially as set forth.

9. The combination with the cooker-body and a steam or vent tube communicating with the upper portion thereof, of a valve case or chamber arranged at the junction of the cooker-body and said steam-tube and provided in its upper end with a passage, a flat vertically-movable valve-plate applied to the upper side of said passage and having a guide-rod, and guides for said guide-rod arranged above and below said valve-plate, substantially as set forth.

10. The combination with the cooker-body and a steam or vent tube provided at its upper end with an enlargement, of a valve case or chamber arranged in said enlargement, communicating at its lower end with the cooker-chamber and provided in its closed upper end with an exit-passage, a vertically-movable valve-plate applied to the upper side of said passage and provided on opposite sides of the latter with vertical guide-rods, and guides for said rods arranged above and below said valve-plate, substantially as set forth.

11. A division-plate or diaphragm for a steam-cooker, consisting of a dish-shaped member having an upwardly-extending marginal rim and provided in its bottom with a steam passage or passages having upwardly-extending guard rims or collars, and adjacent to the rim with drain-openings the edges of which are substantially flush with the upper side of the bottom, substantially as set forth.

12. A division-plate or diaphragm for a steam-cooker, consisting of a dish-shaped member having an upwardly-extending marginal rim and provided in its bottom with a steam passage or passages having upwardly-extending guard rims or collars, and adjacent to the rim with drain-openings, each of said drain-openings having an inclined deflecting lip which extends downwardly and outwardly from its inner edge, substantially as set forth.

Witness my hand this 15th day of June, 1901.

ALEXANDER M. AMOS.

Witnesses:
  THEO. L. POPP,
  EMMA M. GRAHAM.